(12) United States Patent
Bendersky et al.

(10) Patent No.: US 10,360,537 B1
(45) Date of Patent: *Jul. 23, 2019

(54) GENERATING AND APPLYING EVENT DATA EXTRACTION TEMPLATES (71) Applicant: Google Inc., Mountain View, CA (US)

(72) Inventors: Mike Bendersky, Sunnyvale, CA (US); Maureen Heymans, Los Altos, CA (US); Jinan Lou, Cupertino, CA (US); Jie Yang, Santa Clara, CA (US); MyLinh Yang, Saratoga, CA (US); Amitabh Saikia, Mountain View, CA (US); Marc-Allen Cartright, Palo Alto, CA (US); Vanja Josifovski, Los Gatos, CA (US); Hui Tan, Palo Alto, CA (US); Luis Garcia Pueyo, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/484,933

(22) Filed: Apr. 11, 2017

Related U.S. Application Data

(63) Continuation of application No. 14/470,416, filed on Aug. 27, 2014, now Pat. No. 9,652,530.

(51) Int. Cl.
*G06F 17/30* (2006.01)
*G06Q 10/10* (2012.01)
(Continued)

(52) U.S. Cl.
CPC ....... *G06Q 10/1095* (2013.01); *G06F 16/248* (2019.01); *G06F 16/9535* (2019.01); *H04W 4/029* (2018.02)

(58) Field of Classification Search
CPC .................................................. G06F 17/03598
See application file for complete search history.

(56) References Cited

U.S. PATENT DOCUMENTS 6,253,169 B1   6/2001   Apte et al.
7,475,010 B2   1/2009   Chao
(Continued)

FOREIGN PATENT DOCUMENTS

WO   2013082151   6/2013
WO   2013192583   12/2013

OTHER PUBLICATIONS

Kolya, Anup Kumar et al, "A Hybrid Approach for Event Extraction," Polibits (46) 2012, pp. 55-59, ISSN 1870-9044.
(Continued)

*Primary Examiner* — Hung Q Pham
(74) *Attorney, Agent, or Firm* — Middleton Reutlinger (57) ABSTRACT

Techniques are described herein for generating and applying event data extraction templates. In various implementations, a data extraction template may be applied to structured communications to extract, from each structured communication, event data associated with a transient markup language path indicated in the data extraction template. The data extraction template may include an event-related semantic data type assigned to the transient markup language path and a strength of association between the transient structural path and the event-related semantic data type. Feedback may be obtained concerning event data extracted from one or more of the structured communications. Based on the feedback, the strength of association between the transient markup language path and the event-related semantic data type may be altered. The data extraction template may then be applied to a subsequent structured
(Continued)

communication to extract new event data from the structured communication based on the altered strength of association.

14 Claims, 5 Drawing Sheets

(51) Int. Cl.
*G06F 16/248* (2019.01)
*G06F 16/9535* (2019.01)
*H04W 4/029* (2018.01)

(56) References Cited

U.S. PATENT DOCUMENTS

| | | | |
|---|---|---|---|
| 7,496,500 | B2 | 2/2009 | Reed et al. |
| 7,505,984 | B1 | 3/2009 | Nevill-Manning et al. |
| 7,512,605 | B2 | 3/2009 | Spangler |
| 7,660,804 | B2 | 2/2010 | Wen et al. |
| 7,836,012 | B1 | 11/2010 | Nevill-Manning et al. |
| 8,046,226 | B2 | 10/2011 | Soble et al. |
| 8,055,707 | B2 | 11/2011 | Desai et al. |
| 8,082,248 | B2 | 12/2011 | Abouyounes |
| 8,108,206 | B2 | 1/2012 | Hufnagel et al. |
| 8,239,387 | B2 | 8/2012 | Madaan et al. |
| 8,364,467 | B1 | 1/2013 | Bowman et al. |
| 8,386,487 | B1 | 2/2013 | Ben-Artzi et al. |
| 8,458,584 | B1 | 6/2013 | Wilson et al. |
| 8,561,185 | B1 | 10/2013 | Muthusrinivasan et al. |
| 8,583,648 | B1 | 11/2013 | Majkowska |
| 8,589,366 | B1 | 11/2013 | Younes et al. |
| 8,630,989 | B2 | 1/2014 | Blohm et al. |
| 8,775,400 | B2 | 7/2014 | Ickman et al. |
| 8,862,579 | B2 | 10/2014 | Wissner et al. |
| 9,154,514 | B1 | 10/2015 | Prakash |
| 9,563,689 | B1 | 2/2017 | Pueyo et al. |
| 9,652,530 | B1 | 5/2017 | Bendersky et al. |
| 2004/0044674 | A1 | 3/2004 | Mohammadioun et al. |
| 2006/0168006 | A1 | 7/2006 | Shannon et al. |
| 2008/0046441 | A1 | 2/2008 | Wen et al. |
| 2009/0012824 | A1 | 1/2009 | Brockway et al. |
| 2009/0214034 | A1 | 8/2009 | Mehrotra et al. |
| 2010/0100815 | A1 | 4/2010 | Hutchinson et al. |
| 2010/0179961 | A1 | 7/2010 | Berry et al. |
| 2010/0235367 | A1 | 9/2010 | Chitiveli et al. |
| 2010/0325115 | A1 | 12/2010 | Xu |
| 2011/0106892 | A1 | 5/2011 | Nelson et al. |
| 2011/0131034 | A1 | 6/2011 | Moyle et al. |
| 2011/0219081 | A1 | 9/2011 | Parthasarathy et al. |
| 2012/0005221 | A1 | 1/2012 | Ickman et al. |
| 2012/0005284 | A1 | 1/2012 | Tse |
| 2012/0215853 | A1 | 8/2012 | Sundaram et al. |
| 2012/0254181 | A1 | 10/2012 | Schofield et al. |
| 2012/0254388 | A1 | 10/2012 | Duxbury et al. |
| 2012/0297025 | A1 | 11/2012 | Zeng et al. |
| 2012/0317499 | A1 | 12/2012 | Shen |
| 2013/0117012 | A1 | 5/2013 | Orlin et al. |
| 2013/0138655 | A1 | 5/2013 | Yan et al. |
| 2013/0239016 | A1 | 9/2013 | Adams et al. |
| 2013/0311875 | A1 | 11/2013 | Pappas et al. |
| 2015/0073895 | A1 | 3/2015 | Kamin et al. |
| 2015/0095429 | A1 | 4/2015 | Gaines et al. |
| 2015/0358447 | A1 | 12/2015 | Horling et al. |
| 2016/0119268 | A1 | 4/2016 | Sharp et al. |
| 2016/0357718 | A1 | 12/2016 | Gelfand et al. |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Black, Julie et al, "Automated Event Extraction from Email," Jun. 2, 2004, (http://nlp.stanford.edu/courses/cs224n/2004/jblack-final-report.pdf ), 12 pages.

Paone, Lauren "Learned Automatic Recognition Extraction of Appointments from Email," 2006 (http://www.seas.upenn.edu/~cse400/CSE400_2005_2006/Paone/paper.pdf), 12 pages.

Walther, Maximilian "Unsupervised Extraction of Product Information from Semi-structured Sources," Computational Intelligence and Informatics (CINTI), 2012 IEEE 13th International Symposium , Nov. 20-22, 2012, 6 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Grigalis, et al., "Using XPaths of Inbound Links to Cluster Template-Generated Web Pages," Department of Information Systems, Vilnius Gediminas Technical University, Lithuania, Computer Science and Information Systems, Oct. 25, 2013, 11(1):111-131.

Hachenberg, Christian et al., "Locality Sensitive Flashing for Scalable Structural Classification and Clustering of Web Documents," CIKM'13 Oct. 27-Nov. 1 2013, San Francisco, CA, USA, Copyright 2013 ACM 978-1-4503-2263-8/13/10, 10 pages.

Chang, Chia Hui et al., "A Survey of Web Information Extraction Systems," Knowledge and Data Engineering, IEEE Transactions on , vol. 18, No. 10, Oct. 2006, pp. 1411,1428.

Abou-Shoer, Mohamed I. et al, "Extract-Template Modeling and Pattern Recognition in the Assessment of (Cymbopogon Proximus)," American Journal of Analytical Chemistry, vol. 2 No. 4, 2011, pp. 500-510.

Bonomi, Luca et al., "A Two-Phase Algorithm for Mining Sequential Patterns with Differential Privacy," ACM International Conference on Information and Knowledge Management, Oct. 27-Nov. 1, 2013, Burlingame, California, 10 pages.

Chang, Chia-Hui et al., "IEPAD: Information Extraction Based on Pattern Discovery," Proceedings of the 10th International Conference on World Wide Web, 2001, ACM, New York, NY, USA, pp. 681-688.

GENERATING AND APPLYING EVENT DATA EXTRACTION TEMPLATES

BACKGROUND

Business-to-consumer ("B2C") emails and similar communications (more generally referred to herein as "structured communications") may often follow more structured patterns than person-to-person emails, and often are created automatically using templates. However, these templates are not typically made available to entities interested in extracting information such as event-related data from these communications.

SUMMARY

The present disclosure is generally directed to methods, apparatus and computer-readable media (transitory and non-transitory) for analyzing a corpus of communications such as emails to generate one or more data extraction templates. The generated one or more data extraction templates may be configured to extract nonconfidential transient data, particularly event-related data, from subsequent structured communications, while ignoring fixed data that is shared among structured communications of the corpus (e.g., boilerplate) or confidential transient data. For example, a data extraction template may be used to extract, from an email, nonconfidential transient data related to an event such as an event start time, end time, duration, location, title, and so forth. Confidential information (e.g., information that could be used to identify someone) such as a recipient's name, address, credit card number, and so forth, as well as fixed boilerplate, may be ignored.

In some implementations, a corpus of communications may be initially grouped into a plurality of clusters based on similarities between the communications and/or their metadata. For instance, event reminder emails from one entity may form one cluster; event reminder emails from another entity may form another cluster; and non B2C emails that do not fit any particular pattern may form yet another cluster (and in some cases may be discarded). An event data extraction template may be generated for one or more clusters of structured communications as described above. Subsequent structured communications may be analyzed using the same technique as was used to initially group the corpus of structured communications into clusters. The cluster to which a subsequent structured communication is matched may dictate the event data extraction template that is used to extract transient nonconfidential, event-related data from the structured communication.

In some implementations, a computer implemented method may be provided that includes the steps of: applying a data extraction template to a plurality of structured communications to extract, from each of the plurality of structured communications, event data associated with a transient markup language path indicated in the data extraction template, wherein the data extraction template includes an event-related semantic data type assigned to the transient markup language path and a strength of association between the transient structural path and the event-related semantic data type; obtaining feedback concerning event data extracted from one or more of the structured communications; altering, in the data extraction template, the strength of association between the transient markup language path and the event-related semantic data type based on the feedback; and applying the data extraction template to a subsequent structured communication to extract new event data from the subsequent structured communication, wherein the new event data is extracted based on the altered strength of association.

This method and other implementations of technology disclosed herein may each optionally include one or more of the following features.

In various implementations, the method may further include providing, via an output device of a computing device operated by a recipient of one or more of the plurality of structured communications, output indicative of the extracted event data for consumption. In various implementations, the output indicative of the extracted event data may include a calendar entry, and the feedback comprises acceptance or rejection by the recipient of the calendar entry. In various implementations, the method may further include determining a likelihood that the data extraction template is event-related based at least in part on the feedback.

In various implementations, the feedback may include one or more signals provided by a mobile device carried by a recipient of one or more of the plurality of structured communications. In various implementations, the one or more signals may include global positioning system ("GPS") coordinates and associated time stamps. In various implementations, one or more of the segments of text may include one or more dates or times associated with an event, an event location, and/or an event title.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
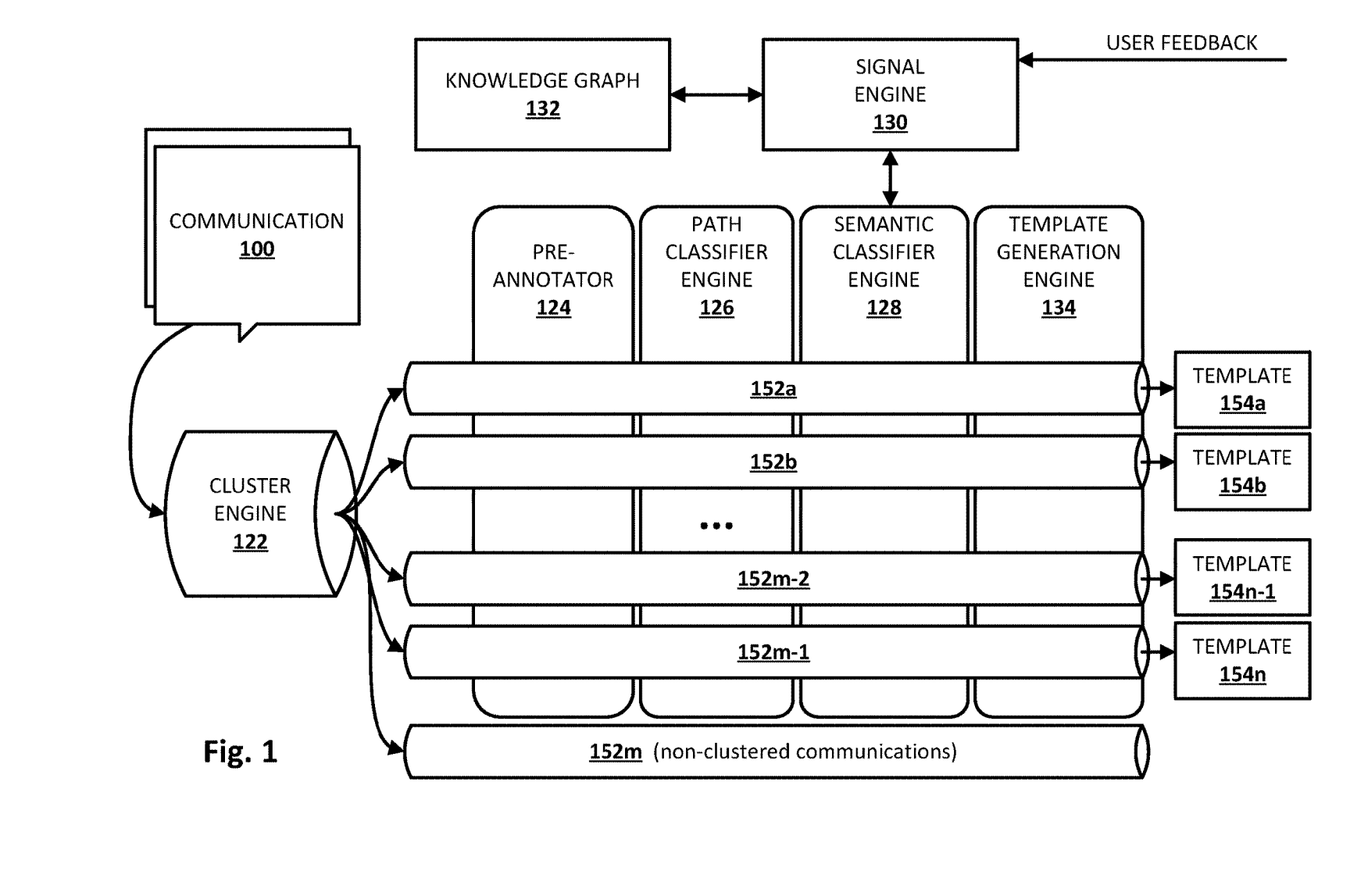
FIG. 1 illustrates an example of how a corpus of communications may be analyzed by various components of the present disclosure to generate one or more event data extraction templates.

FIG. 1 illustrates an example environment in which a corpus of communications 100 may be grouped into clusters 152*a-m*, and in which clusters containing structured communications may be analyzed to generate event data extraction templates 154*a-n*. As used herein, a "structured communication" may refer to an email, a text message (e.g., SMS, MMS), an instant message, and any other B2C communications, that are typically (but not always) automatically generated, e.g., using a template. In various implementations, structured communications may be structured using various markup languages such as the eXtensible Markup Language ("XML") or the Hypertext Markup Language ("HTML"), though this is not required. In various implementations, a communication 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 122 may be configured to group the corpus of communications 100 into a plurality of clusters 152a-m based on one or more patterns shared among one or more structured communications 100 within the corpus. In some implementations, cluster engine 122 may have one or more preliminary filtering mechanisms to discard communications that are not suitable for template generation. For example, if a corpus of communications 100 under analysis includes personal emails and B2C emails, personal emails may be discarded. In other implementations, cluster engine 122 may group non-structured communications into their own clusters (e.g., 152m in FIG. 1), and may refrain from generating data extraction templates for those clusters.

Cluster engine 122 may utilize various aspects of communications 100 to group communications 100 into clusters. These aspects may include but are not limited to metadata, formatting information (e.g., HTML nodes, xPaths, etc.), textual similarities, byte similarities, and so forth.

In some implementations, cluster engine 122 may be configured to analyze a communication 100 using one or more regular expressions. For example, emails from a particular sending entity (which may include emails from more than one email address) may be analyzed to determine a frequency of occurrences of words found in the emails' subjects. Words satisfying a particular criterion (e.g., a frequency threshold) may be considered "fixed." Words that do not satisfy the criterion may be considered "transient." In some implementations, the emails' subjects may then be analyzed again to generate regular expressions. Fixed terms may remain unchanged in the regular expressions (e.g., represented as "constants"). Transient words/terms may be replaced with regular expression wildcards. In some implementations, each element of the set of unique regular expressions may represent a unique cluster. An email may be assigned to a cluster associated with a regular expression that best matches the email's subject. A cluster may be considered a "best match" for an email based on various metrics, such as the cluster having the longest matching regular expression for the email's subject.

Additionally or alternatively, communications 100 may be clustered based on underlying structural similarities. For example, a set of xPaths for an email (e.g., a set of addresses to reach each node in the email's HTML node tree) may be independent of the email's textual content. Thus, the similarity between two or more such emails may be determined based on a number of shared xPaths. An email may be assigned to a particular cluster based on the email sharing a higher number of xPaths with emails of that cluster than with emails of any other cluster. Additionally or alternatively, two emails may be clustered together based on the number of xPaths they share compared to, for instance, a total number of xPaths in both emails.

In some implementations, communications 100 may additionally or alternatively be grouped into clusters based on textual similarities. For example, emails may be analyzed to determine shared terms, phrases, ngrams, ngrams plus frequencies, and so forth. Based on these data points, emails may be clustered. For example, emails sharing a particular number of shared phrases and ngrams may be clustered together.

In some implementations, emails may be grouped into clusters based on byte similarity. For instance, emails may be viewed as strings of bytes that may include one or both of structure (e.g., metadata, xPaths) and textual content. In some implementations, a weighted combination of two or more of the above-described techniques may be used as well. For example, both structural and textual similarity may be considered, with a heavier emphasis on one or the other.

Once corpus of communications 100 are grouped into clusters 152a-m, some clusters may contain structured communications that are highly likely to include the same boilerplate and structure, and to have transient event-related data (which may be the primary data of interest for extraction) in approximately the same locations (e.g., spatially and/or in terms of the same xPath). A preannotator 124, path classifier engine 126, semantic classifier engine 128, and/or event template generation engine 134 may then perform various downstream processing to produce event data extraction templates 154a-n for clusters 152a-m.

In some implementations, optional preannotator 124 may be configured to identify segments of text in structured communications of a particular cluster 152 that likely represent event-related information and annotate them, e.g., in a generalized fashion. For example, in some implementations, preannotator 124 may find text that represents a specific date, such as "<p>Date: Mar. 26, 2014</p>," or that matches a textual pattern generally representative of a date (e.g., "MM/DD/YYYY"), and may annotate that text or even replace it with something more general, like "<p>Date: {structure.email.date}qp>." Other segments of text that match other patterns, such as credit card numbers (e.g., "DDDD DDDD DDDD DDDD"), may also be replaced with generalized texts in a similar fashion. In some implementations, when event data extraction templates 154a-n are used later to extract event data from subsequent structured communications, preannotator 124 may be disabled to preserve the actual information contained in the subsequent structured communications.

Path classifier engine 126 may be configured to identify, from structured communications of a particular cluster 152 (which in some implementations may be preannotated by preannotator 124), a set of structural paths. As used herein, a "structural path" may refer to an address (e.g., through markup language nodes) to reach a node in a structured communication. xPaths are one such example. "Structural paths" may exist for various types of markup languages, including but not limited HTML as mentioned previously, and XML. In some implementations, path classifier engine 126 may collect all xPaths from all structured communications in a particular cluster 152 into a set. Path classifier engine 126 may then classify the structural paths in the set in various ways depending on the nature of text or other data that are associated with the structural paths.

For example, in some implementations, path classifier engine 126 may classify a structural path underlying a segment of text that is not shared among all emails (e.g., a particular departure or arrival time, a departure or arrival airport, a flight duration, and so forth) of a cluster as "transient." In some implementations, path classifier engine 126 may classify a particular structural path underlying a particular segment of text as transient in response to a determination, e.g., by path classifier engine 126, that a count of occurrences of the particular segment of text across the particular cluster satisfies some criterion (e.g., a frequency threshold). In some implementations, if a segment of text has been replaced by or annotated with a generalized preannotation, e.g., by preannotator 124, the underlying structural path may be classified by path classifier engine 126 as transient.

Path classifier engine 126 may classify a structural path that is associated with a segment of text that is shared among all (or most) structured communications of the cluster as "fixed" (e.g., boilerplate). In various implementations, path classifier engine 126 may classify a particular structural path associated with a particular segment of text as fixed in response to a determination, e.g., by path classifier engine 126, that a count of occurrences of the particular segment of text across the particular cluster fails to satisfy the aforementioned threshold, or satisfies another threshold. Various criteria may be used to determine that a structural path underlying a particular segment of text is transient or fixed, such as a minimum/maximum threshold (e.g., if the segment of text is found in less or more than a particular number of emails in a cluster, or in a percentage of the emails that is above or below a threshold).

Suppose a particular segment of text such as a specific departure time (e.g., May 1, 2015 at 8:00 am) is only shared among a small number of emails in a cluster (or even only in a single email). That segment of text is not likely boilerplate, but instead is likely transient data of potential interest for extraction. Path classifier engine 126 may classify the structural path underlying that segment of text as "transient." In contrast, another segment of text such as "Departure time:" that is repeated among numerous emails in a cluster may likely be boilerplate (although as noted below it may be used as a signal by semantic classifier engine 128). Path classifier engine 126 may classify the structural path underlying that segment of text as "fixed."

In some implementations, path classifier engine 126 may construct a bipartite graph. Nodes in a first set may represent structural paths. Nodes in a second set may represent corresponding segments of text, with edges to the corresponding nodes in the first set. Edges between nodes in the first and second sets may be weighted, e.g., by a number of occurrences of a particular segment of text in association with a particular structural path. The node pairs may be sorted by their edge weights, and those weights that satisfy a particular threshold (e.g., less than a predetermined weight or some other similar threshold) may be considered "transient." Node pairs having edges with weights that satisfy some other threshold (e.g., greater than the predetermined weight) may be considered "fixed."

Suppose a cluster of emails are from a particular airline and are meant to communicate itineraries to passengers. One structural path (e.g., "/html/body/div/h3/") of the set of structural paths obtained from the emails of the cluster may be represented by a first node with a value, "/html/body/div/h3/". That first node may be connected to a textual node (e.g., "Departure Airport:") via an edge. That edge may have a weight that satisfies a threshold because most if not all emails of the cluster will likely include the text "Departure Airport:" in association with the same xPath. Accordingly, that first node (and its corresponding structural path) may be classified as "fixed."

Another structural path (e.g., "/html/body/div/p") of the set of structural paths obtained from the emails of the cluster may be represented by a second node with a value, "/html/body/div/p". That second node may be connected via numerous edges to numerous textual nodes representing strings of text describing different departure airports. Many of those edges may therefore have weights that that do not satisfy the aforementioned threshold, or that satisfy a different threshold (e.g., less than 5% of node pairs reflect that correspondence). Accordingly, that second node (and its corresponding structural path) may be classified as "transient."

In some implementations where a bipartite graph is constructed, an algorithm such as the following may be implemented:

```
graph={ }
for each email in cluster
    for each xpath in email
        text=GetText(xpath)
        graph[text]=xpath
        graph[xpath]=text
    end for
end for
xpath_set=SortAllXPaths(graph)
```

An event data extraction template (e.g., 154) may be generated from a bipartite graph generated using this algorithm. In some implementations, an event data extraction template 154 may include a sorted sequence of fixed structural paths, transient structural paths, and/or fixed segments of text.

In some implementations, a particular textual node may have a frequency f that is equal to a number of occurrences of that textual string across emails of a cluster. Textual nodes with frequencies f that satisfy a particular threshold or function may be classified as fixed. The following are non-limiting examples of functions that may be used to classify a textual node as fixed or transient, with N being a positive integer that is equal to a number of emails in a cluster:

A textual may be fixed where f/N>threshold where $$threshold = upper\_limit - \frac{2}{3} \times \sqrt{\frac{N}{k}} \times (upper\_limit - lower\_limit)$$

"upper_limit" may be a maximum fraction or percentage of structured communications to consider something fixed. For example, if upper_limit is equal to 0.2, then every segment of text that appears in more than 20% of structured communications of a cluster is considered fixed. "lower_limit" may be a minimum fraction or percentage of structured communications to consider something fixed. For example, if lower_limit is equal to 0.01, then every segment of text that appears in less than 1% of structured communications of a cluster is considered transient. k may be a constant selected based on various criteria. In some implementations, k may be a number of structured communications at which a curve representing the threshold peaks, flattens, and even begins decreasing. For example, if a cluster includes a relatively large number of emails, then k may be reduced. "min_occurrence_ratio_range" may be a difference between a maximum percentage allowed and a minimum percentage allowed.

Semantic classifier engine 128 may be configured to determine semantic data types to be assigned to the transient structural paths classified by path classifier engine 126. While semantic data types may come in a variety of forms, this disclosure will focus on semantic data types that are specific to events, referred to herein as "event data types."

Semantic classifier engine 128 may determine event data types of one or more transient structural paths based on various signals. Some signals may come in the form of preannotations, e.g., added by preannotator 124, that indicate that a particular segment of text represents a date, or a location, or a start or end time, or some other aspect of an event. Other signals may be associated with structured communications of a particular cluster of structured communications, and may include things like metadata (e.g., sending entity, textual patterns in subjects, etc.), context, and/or content of structured communications, particularly segments of text associated with structural paths that are considered "fixed."

In some implementations, a signal engine 130 may be configured to obtain, organize and/or provide such signals to semantic classifier engine 128.

As will be explained further below, signal engine 130 also may receive one or more signals in the form of feedback. This feedback may be user feedback that, for instance, is representative of users' acceptance of event data extracted from subsequent communications using templates 154a-n. Semantic classifier engine 128 may utilize this feedback to, for instance, alter a strength of association between a transient structural path and an event data type assigned to it.

In some implementations, semantic classifier engine 128 may assign an event data type to a particular transient structural path based on application of one or more event heuristics. Event heuristics may come in various forms, and may be used to attempt to identify various aspects of an event described in a communication. For example, semantic classifier engine 128 may apply one or more event location heuristics to structured communications of a cluster 152 to determine whether a particular transient structural path underlies text that represents an event location. Such heuristics may include comparison of text of a structured communication to one or more text patterns typically associated with postal addresses. These text patterns may vary across countries that may have different postal standards. For example, the following regular expression may match many (but not all) postal addresses in the United States:
\d{1,7}    [A-z]*[A-z]*(Street|Avenue|Court|Lane|Parkway|Road|Circle), [A-z]*, [A-Z]{2} \d{5}

Another event location heuristic is comparison of text of a structured communication to one or more location entities in a database. For example, signal engine 130 may be in communication with a knowledge graph 132. Knowledge graph 132 may include nodes that represent various "entities" and edges that represent relationships between those entities. Such a knowledge graph may be built, for instance, by crawling a plurality of databases, online encyclopedias, and so forth, to accumulate nodes presenting entities and edges representing relationships between those entities. Entities may include, for example, persons, things, events, etc. Some entities may include places or locations, such as establishments (e.g., restaurants, bars, venues, stadiums, etc.) or points of interest (e.g., cemetery, park, beach, etc.). If a segment of text represents a known event establishment (e.g., "Central Park," "Sal's Bistro"), then a transient structural path underlying that text may be classified by semantic classifier engine 128 as "event location."

In some implementations, results of event location heuristics may be verified using various techniques. Suppose a segment of text in a communication associated with a particular transient structural path is recognized (e.g., using pattern recognition) as a US postal address, and that a segment of text located nearby in the communication (e.g., immediately before or after, or in an adjacent table cell) is the name of an establishment (e.g., "Joe's Bar"). Semantic classifier engine 128 may consult with signal engine 130, which in turn may consult with knowledge graph 132, to determine whether an entity associated with "Joe's Bar" is, in fact, located at the pattern-recognized address.

Other event heuristics may be applied by semantic classifier engine 128 to determine whether a particular transient structural path underlies text that represents an event date, event start time, or event end time. For example, one or more dates or times may be extracted from one or more structured communications of a cluster, e.g., pursuant to one or more rules. In some implementations, the one or more extracted dates or times may be traversed, e.g., in document object model ("DOM") traversal order, to determine that the event data type of the text associated with the structural path under analysis represents an event date, event start time, or event end time.

In some implementations, one date or time extracted from a structured communication may be compared to another date or time extracted from elsewhere in the structured communication to determine which is an event start time, which is an event end time, and so forth. In some implementations, rules such as those shown in Table 1, below, may be applied.

TABLE 1

| Input Date | Input Time | Previous Date | Previous Time | Event Date | Event Time |
|---|---|---|---|---|---|
| * | * | date0 | time0 | date0 | time0 |
| date1 | time1 | — | — | date1 | time1 |
| date1 | time1 | date0 | — | date1 | time1 |
| date1 | time1 | — | time0 | date1 | time1 |
| date1 | — | — | — | date1 | — |
| — | time1 | — | — | — | time1 |
| date1 | — | date0 | — | date1 | — |
| — | time1 | — | time0 | — | time0 |
| date1 | — | — | time0 | date1 | — |
| — | time1 | date0 | — | date0 | time1 |

Table 1 may be interpreted as follows. "Input Date" and "Input Time" may represent the latest date or time encountered, respectively, while traversing the extracted dates and times in DOM traversal order. "Previous Date" and "Previous Time" may represent previously encountered dates and times, respectively. "Event Date" and "Event Time" may indicate the date and time, respectively, of an event, that are determined based on respective values of Input Date, Previous Date, Input Time, and Previous Time. For example, if an input date, date1, and an input time, time1, are encountered, then a previously encountered date, date0, and time, time0, may be discarded. If no further dates or times are encountered during traversal, then structural paths underlying date1 and time1 may be classified, e.g., by semantic classifier engine 128, as "Event Date" and "Event Time," respectively.

In addition to comparing dates and/or times found in a communication to other dates or times found in the communication, in various implementations, semantic classifier engine 128 may also compare dates/times found in the communication to a date the communication was sent and/or received. In some instances, if a date/time found in a communication precedes the date the communication was sent/received, then that date/time may be disregarded as representative of an event that will occur in the future.

Event title heuristics may be applied by semantic classifier engine 128 to determine whether a particular transient structural path underlies text that may be used as an event title. For example, in some implementations, semantic classifier engine 128 may utilize heuristics such as the following to determine a structural path underlying a potential title of an event.

1. Select as a title text enclosed in a particular type of HTML/XML tags, such as "<h1><a> . . . </a></h1>"
2. Select a title based on one or more transient structural paths contained in a regular expression used to analyze a subject of structured communication. For example, a substring could be used that starts with text associated with a first transient structural path of the subject regular expression and continues until the end of the subject. Suppose the following subject regular expression, "Event Invite:.* birthday." If a particular email includes the subject, "Event Invite: Jonathan's birthday," then the title of the event may be "Jonathan's Birthday."
3. Select a title based on a determination that a transient structural path is at a same level (e.g., HTML xPath level) as another transient structural path underlying another segment of text that is indicative of an event date, event time, or an event location.
4. If these rules fail, then simply select the subject itself as the event title.

While these event heuristics are described above as being used to determine whether transient structural paths of clusters (or a corpus) of structured communications are used for event-related data, so that a suitable event data extraction template may be generated, this is not meant to be limiting. The same or similar event heuristics may be applied directly to communications such as emails, without the use of or regard to a data extraction template, to extract event data directly from the communications.

In some implementations, semantic classifier engine 128 may employ various techniques to protect information users may consider sensitive or otherwise confidential. For example, semantic classifier engine 128 may classify (or reclassify) one or more structural paths, previously classified as transient, as "confidential." In subsequent processing of structured communications (see FIG. 2), segments of text associated with transient, but confidential, structural paths may be ignore or otherwise discarded.

Semantic classifier engine 128 may classify (or reclassify) a particular structural path as confidential based on various signals, e.g., provided by signal engine 130. For example, sensitive data like credit card numbers or social security numbers may have known numeric patterns that semantic classifier engine 128 (or signal engine 130) may recognize. Semantic classifier engine 128 may also determine that an otherwise transient structural path should be deemed confidential based on semantic data types assigned to other structural paths, e.g., located nearby in a structured communication. For example, a user's departure date alone may not be considered sensitive. However, if a nefarious party where to learn about a user's departure date in combination with the user's identity and/or address, that nefarious party may deduce that the user will be out of town as of the departure date. In such a scenario, semantic classifier engine 128 may classify the structural path underlying the departure date in the email as non-confidential transient, but may classify structured paths underlying other information that could be used to identify the user, such as their name, address, phone number, email address, job title, etc., as confidential. Some semantic data types may automatically be classified, e.g., by semantic classifier engine 128, as confidential, such as credit card numbers, user-identifying information (e.g., name, social security number, full address, etc.), information related to a user's health, and so forth.

Template generation engine 134 may be configured to generate one or more event data extraction templates 154*a-n*, e.g., based the classified transient structural paths provided by path classifier engine 126 and/or semantic classifier engine 128. Event data extraction templates 154*a-n* may be usable by various components (see FIG. 2) to extract, from one or more structured communications, one or more event-related pieces of information associated with transient (and in some cases, non-confidential) structural paths.

Operations performed by cluster engine 122, pre-annotator 124, path classifier engine 126, semantic classifier engine 128, signal engine 130, knowledge graph 132, and/or template generation engine 134 may be performed on individual computer systems, distributed across multiple computer systems, or any combination of the two. These one or more computer systems may be in communication with each other and other computer systems over one or more networks (not depicted).

Figure 2:
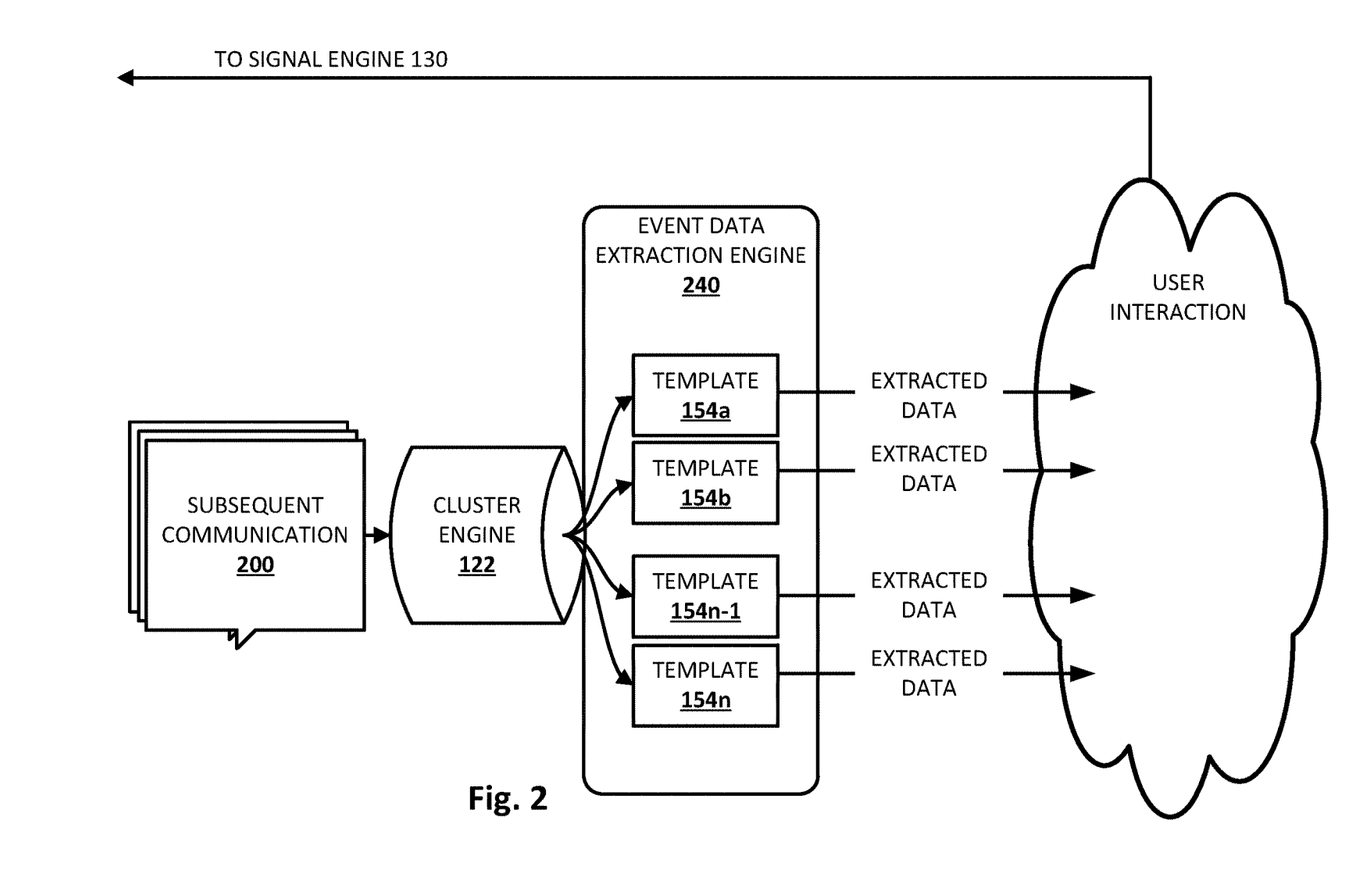
FIG. 2 illustrates an example of how event data may be extracted from a subsequent structured communication using one or more event data extraction templates generated in FIG. 1.

FIG. 2 depicts an example of how subsequent communications 200 may be analyzed after a plurality of data extraction templates 154*a-n* have been generated. Cluster engine 122 may be configured to employ techniques similar to those described above to determine which cluster communications 200 should be associated with. An event data extraction engine 240 may apply an appropriate data extraction template (e.g., one of 154*a-n*) to communications to extract data associated with one or more transient structural paths. For example, event data extraction engine 240 may utilize a particular template 154 to extract segments of text associated with non-confidential transient structural paths from a particular cluster of communications. Event data extraction engine 240 may likewise ignore or discard segments of text associated with confidential and/or fixed structural paths.

As noted above, the extracted data may be "consumed," e.g., by being interacted with by one or more users. One or more characteristics of this user interaction may be provided, e.g., as feedback, to signal engine 130 (see FIG. 1). Suppose a particular event data extraction template 154 is used on five emails to automatically create five calendar events for five recipients. Suppose further that of those five recipients, four reject the created calendar entry. Data indicative of the rejection by the four may be obtained, e.g., as feedback, for signal engine 130. Based on this feedback, semantic classifier engine 128 may determine that the event data types it assigned to those emails were inaccurate, and may, for instance, reduce a strength of association in the event data extraction template 154 between those transient structural paths and their assigned event data types. In some implementations, if enough users demonstrate dissatisfaction with extracted data (e.g., as might be the case if structured communications of a cluster constitute SPAM), then the data extraction template itself may be reclassified, e.g., as non-event related.

Figure 3:
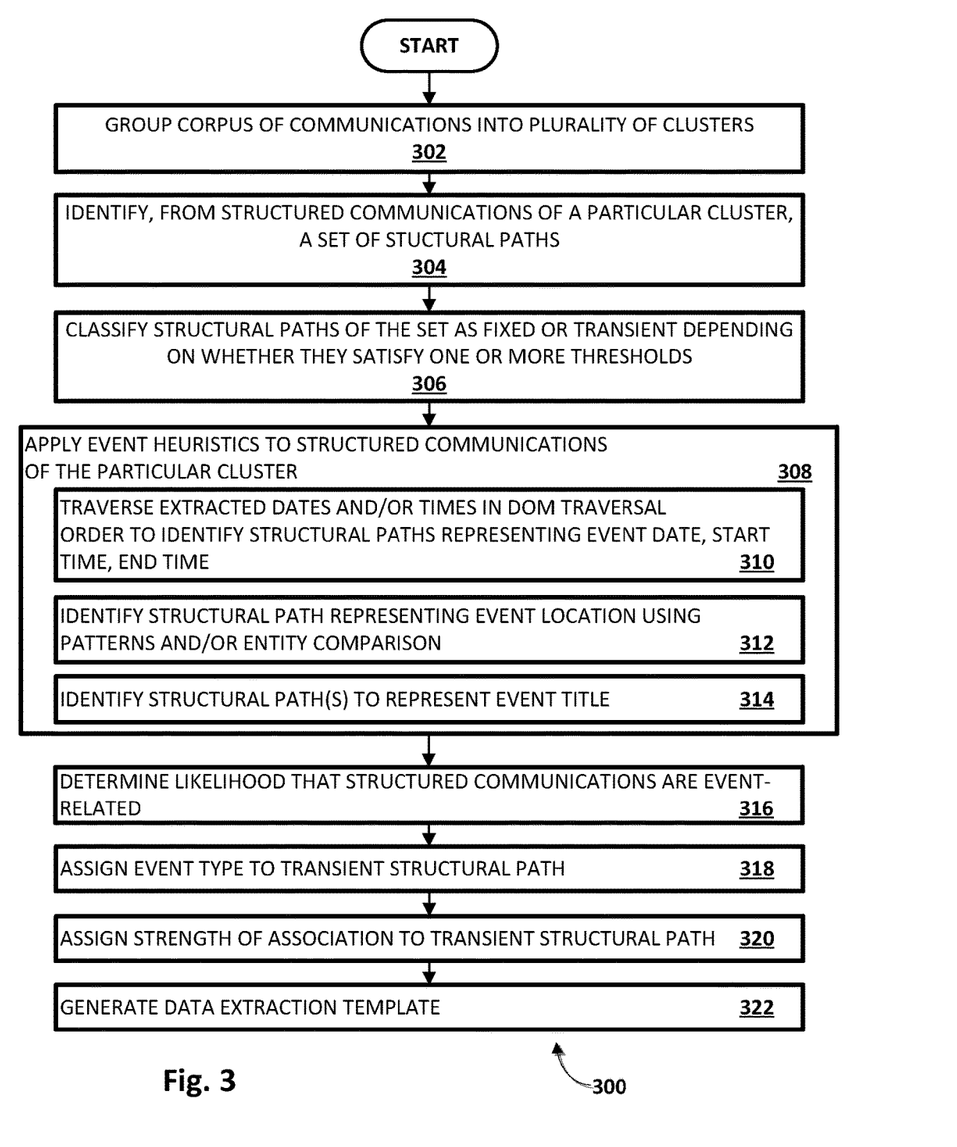
FIG. 3 depicts a flow chart illustrating an example method of generating event data extraction templates.

Referring now to FIG. 3, an example method 300 of clustering communications and generating event data extraction templates is described. For convenience, the operations of the flow chart are described with reference to a system that performs the operations. This system may include various components of various computer systems. Moreover, while operations of method 300 are shown in a particular order, this is not meant to be limiting. One or more operations may be reordered, omitted or added.

At block 302, the system may group a corpus of communications into a plurality of clusters, e.g., based on one or more pieces of metadata associated with each structured communication. For instance, a sending entity in combination with one or more textual patterns in an email subject may be used to select a cluster for an email. One or more of the resulting clusters may be clusters of structured communications, such as B2C emails. At block 304, the system may identify, from structured communications in a particular cluster of structured communications, a set of structural paths (e.g., xPaths). At block 306, the system may classify one or more structural paths of the set identified at block 304 as fixed or transient, e.g., depending on whether segments of text associated with each structural path satisfies one or more thresholds or other criteria.

At block 308, the system may apply one or more event heuristics to structured communications of the particular cluster. For example, at block 310, the system may extract dates and/or times (e.g., using pattern recognition, etc.) and then may traverse those extracted dates and/or times in DOM traversal order. Using rules such as those depicted in Table 1, above, the system may identify which transient structural paths likely represent various aspects of an event, such as event start time, end time, and/or event date.

Application of event heuristics may continue at block 312, where one or more transient structural paths that represent an event location may be identified. For example, in some implementations, a segment of text associated with a transient structural path may be compared to one or more text patterns (e.g., regular expressions) configured to match postal addresses. Additionally or alternatively, the segment of text may be compared to one or more location-related entities (e.g., establishments, points of interest) in a database. Based on these comparisons, the system may determine which transient structural paths likely represent an event location.

Application of event heuristics may continue at block 314, where the system may identify one or more structural paths that may represent an event title. For example, the system may apply the event title heuristics described above to an email subject, in the same order as above or in a different order, to identify a transient structural path that is suitable for representing an event title.

At block 316, the system may determine a likelihood that the structured communications of the cluster-under-analysis (and hence, the resulting data extraction template) are event-related. For example, if the event heuristics of blocks 310-314 are applied successfully to identify more than a particular number of event-related transient structural paths, then the system may determine that the structured communications are likely event-related. In some embodiments, a determined likelihood that structured communications of a particular cluster are event-related may be directly related to (e.g., proportional to) a number of event heuristics that successfully yield results. In some implementations, other signals may be used, such as presence of particular key phrases in the subject or body of a communication, such as "Appointment confirmed," "Concert tickets," "will be delivered on MM/DD/YYYY," and so forth.

At block 318, the system may assign an event data type or one or more transient structural paths identified at block 304 (and classified as transient at block 306) based on the applying of block 308. For example, if the heuristic of block 310 reveals that a particular transient structural path underlies an event start time, then that transient structural path may be so classified. At block 320, the system may assign, to a transient structural path, a strength of association between the transient structural path and its assigned event data type. In various implementations, this strength of association may be determined based on the applying of block 308. For instance, suppose numerous transient structural paths in a cluster of structured communications are classified as potentially representing an event location. The strength of association between any one of those transient structural paths and its assigned event data type may be weaker than if only one transient structural path of the cluster were classified as potentially representing an event location.

At block 322, the system may generate an event data extraction template for each cluster. As noted above as shown in FIG. 2, the event data extraction template may be usable, e.g., by event data extraction engine 240, to extract, from subsequent structured communications, segments of text associated with non-confidential transient structural data paths, and to ignore and/or discard segments of text associated with fixed and/or confidential structural paths.

Figure 4:
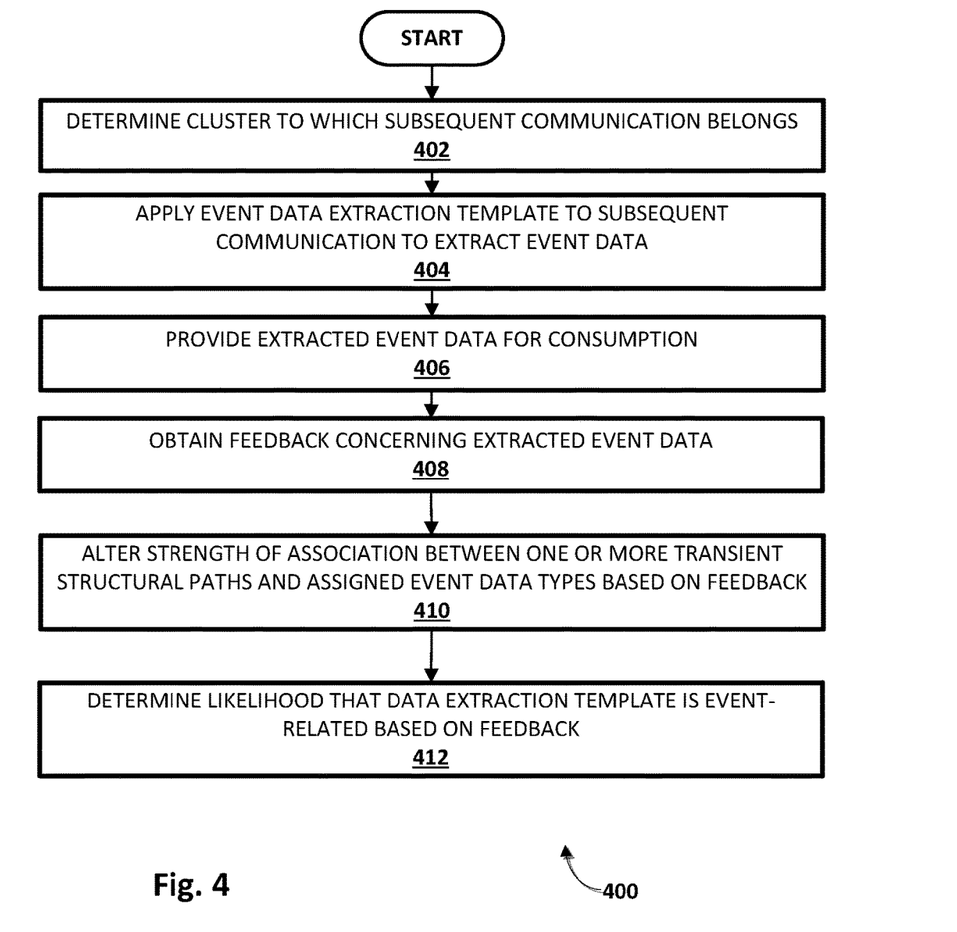
FIG. 4 depicts a flow chart illustrating an example method of applying and evaluating event data extraction templates.

Referring now to FIG. 4, an example method 400 of applying an event data extraction template is described. For convenience, the operations of the flow chart are described with reference to a system that performs the operations. This system may include various components of various computer systems. Moreover, while operations of method 400 are shown in in a particular order, this is not meant to be limiting. One or more operations may be reordered, omitted or added.

At block 402, the system may determine a cluster to which a subsequent communication belongs. This operation may be performed in a manner similar (or virtually identical) to the operation performed at block 302 of FIG. 3. Once the cluster to which the subsequent communication belongs is identified, at block 404, an event data extraction template previously generated for that cluster may be applied to the subsequent communication to extract event data.

At block 406, the system may provide the extracted event data for consumption. This may be performed in a variety of ways. In some embodiments, a proposed calendar entry may be presented to the user. In some instances, the user may be prompted to accept or reject the calendar entry. In other implementations, a "card" or other notification communicating the event may be presented to the user, e.g., on a touch screen of the user's smart phone.

At block 408, the system may obtain feedback concerning the extracted event data. For example, a user's rejection of a proposed calendar entry may act as negative feedback. By contrast, if a user attends an event, then various signals that are caused by the user's attendance may act as positive feedback. For example, if the user carries her global positioning system ("GPS") enabled smart phone to the event, the smart phone may provide GPS coordinates and associated time stamps that corroborate the user's presence at the event.

At block 410, the system may alter (e.g., strengthen, weaken) one or more strengths of association between one or more transient structural paths and their assigned event data types based on the feedback obtained at block 408. For example, suppose a particular transient structural path is classified as "event start time," but feedback from users obtained over time indicates that the transient structural path does not accurately reflect the beginning of events. The system may weaken a strength of association between that transient structural path and its assigned event data type, "event start time."

At block 412, the system may determine (or alter an existing) likelihood that the data extraction template is event-related, e.g., based on feedback obtained at block 408. For example, suppose users consistently reject proposed calendar entries created with data extracted from emails using a particular event data extraction template. That may indicate that structured communications that fit into that cluster may not actually describe events. Alternatively, even if those structured communications that fit into that cluster describe events, it may be the case that users are not interested in attending those events. Thus the event data extraction template associated with that cluster may be determined to be less likely to be event-related (insofar that "event-related" means an event that a user truly has interest in).

Figure 5:
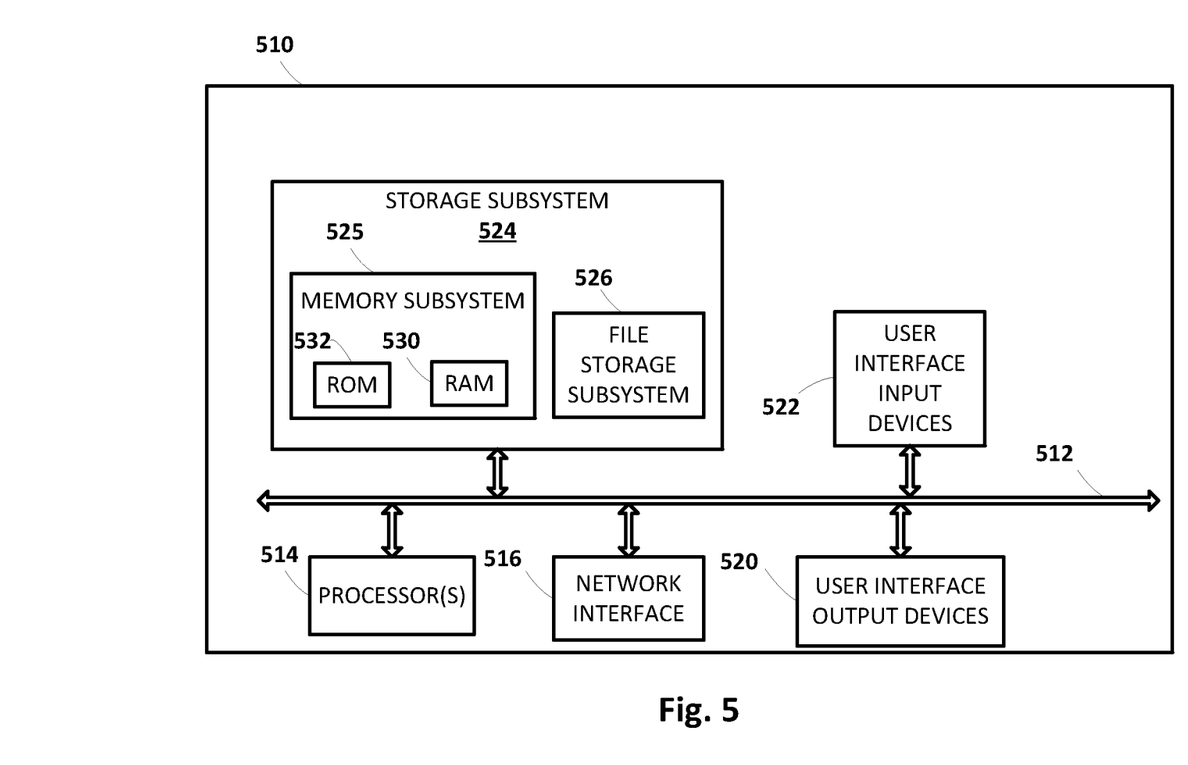
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of methods 300, 400 and/or to implement one or more of cluster engine 122, preannotator 124, path classifier engine 126, semantic classifier engine 128, signal engine 130, template generation engine 134, and/or event data extraction engine 240.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    providing a data extraction template that indicates one or more transient markup language paths, including a given transient markup language path, wherein the data extraction template includes an event-related semantic data type assigned to the given transient markup language path and a strength of association between the given transient structural path and the event-related semantic data type;

applying the data extraction template to a plurality of structured communications to extract, from each of the plurality of structured communications, event data associated with the given transient markup language path indicated in the data extraction template;

obtaining feedback concerning the event data extracted from one or more of the structured communications based on the given transient markup language path indicated in the data extraction template;

altering, in the data extraction template, the strength of association between the given transient markup language path and the event-related semantic data type assigned to the transient markup language path based on the feedback; and subsequent to the altering, applying the data extraction template to a subsequent structured communication to extract new event data from the subsequent structured communication based on the given transient markup language path, wherein the new event data is extracted based on the altered strength of association.

2. The computer-implemented method of claim 1, further providing, via an output device of a computing device operated by a recipient of one or more of the plurality of structured communications, output indicative of the extracted event data for consumption.

3. The computer-implemented method of claim 2, wherein the output indicative of the extracted event data comprises a calendar entry, and the feedback comprises acceptance or rejection by the recipient of the calendar entry.

4. The computer-implemented method of claim 1, further comprising determining a likelihood that the data extraction template is event-related based at least in part on the feedback.

5. The computer-implemented method of claim 1, wherein the feedback comprises one or more signals provided by a mobile device carried by a recipient of one or more of the plurality of structured communications.

6. The computer-implemented method of claim 5, wherein the one or more signals comprise global positioning system ("GPS") coordinates and associated time stamps.

7. A system including memory and one or more processors operable to execute instructions stored in the memory, comprising instructions to:

providing a data extraction template that indicates one or more transient markup language paths, including a given transient markup language path, wherein the data extraction template includes an event-related semantic data type assigned to the given transient markup language path and a strength of association between the given transient structural path and the event-related semantic data type;

apply the data extraction template to a plurality of structured communications to extract, from each of the plurality of structured communications, event data associated with the given transient markup language path indicated in the data extraction template;

obtain feedback concerning the event data extracted from one or more of the structured communications based on the transient markup language path indicated in the data extraction template;

alter, in the data extraction template, the strength of association between the given transient markup language path and the event-related semantic data type assigned to the transient markup language path based on the feedback; and subsequent to the altering, apply the data extraction template to a subsequent structured communication to extract new event data from the subsequent structured communication, wherein the new event data is extracted based on the altered strength of association.

8. The system of claim 7, further comprising instructions to provide, via an output device of a computing device operated by a recipient of one or more of the plurality of structured communications, output indicative of the extracted event data for consumption.

9. The system of claim 8, wherein the output indicative of the extracted event data comprises a calendar entry, and the feedback comprises acceptance or rejection by the recipient of the calendar entry.

10. The system of claim 7, further comprising instructions to determine a likelihood that the data extraction template is event-related based at least in part on the feedback.

11. The system of claim 7, wherein the feedback comprises one or more signals provided by a mobile device carried by a recipient of one or more of the plurality of structured communications.

12. The system of claim 11, wherein the one or more signals comprise global positioning system ("GPS") coordinates and associated time stamps.

13. At least one non-transitory computer-readable medium comprising instructions that, in response to execution of the instructions by one or more processors, cause the one or more processors to perform the following operations:

providing a data extraction template that indicates one or more transient markup language paths, including a given transient markup language path, wherein the data extraction template includes an event-related semantic data type assigned to the given transient markup language path and a strength of association between the given transient structural path and the event-related semantic data type;

applying the data extraction template to a plurality of structured communications to extract, from each of the plurality of structured communications, event data associated with the given transient markup language path indicated in the data extraction template;

obtaining feedback concerning the event data extracted from one or more of the structured communications based on the transient markup language path indicated in the data extraction template;

altering, in the data extraction template, the strength of association between the given transient markup language path and the event-related semantic data type assigned to the transient markup language path based on the feedback; and subsequent to the altering, applying the data extraction template to a subsequent structured communication to extract new event data from the subsequent structured communication based on the given transient markup language path, wherein the new event data is extracted based on the altered strength of association.

14. The at least one non-transitory computer-readable medium of claim 13, further comprising instructions to provide, via an output device of a computing device operated by a recipient of one or more of the plurality of structured communications, output indicative of the extracted event data for consumption.

* * * * *